(12) United States Patent
Edwards et al.

(10) Patent No.: US 7,367,029 B2
(45) Date of Patent: *Apr. 29, 2008

(54) METHOD AND SYSTEM FOR HANDLING DATA (75) Inventors: Warren Keith Edwards, San Francisco, CA (US); Mark Webster Newman, San Francisco, CA (US); Trevor Smith, San Francisco, CA (US); Jana Zdislava Sedivy, Palo Alto, CA (US); Karen Marcelo, San Francisco, CA (US); Shahram Izadi, Bicester (GB); Jason Hong, Berkeley, CA (US)

(73) Assignee: Xerox Corporation, Stamford, CT (US)

( * ) Notice: Subject to any disclaimer, the term of this patent is extended or adjusted under 35 U.S.C. 154(b) by 558 days.

This patent is subject to a terminal disclaimer.

(21) Appl. No.: 10/212,375

(22) Filed: Aug. 1, 2002

(65) Prior Publication Data

US 2004/0025168 A1    Feb. 5, 2004

(51) Int. Cl.
*G06F 9/44* (2006.01)
(52) U.S. Cl. .................. 719/315; 719/316; 709/203
(58) Field of Classification Search .......... 719/319, 719/328, 310, 311, 313, 315, 316; 709/203, 709/213, 223
See application file for complete search history.

(56) References Cited

U.S. PATENT DOCUMENTS

| 5,220,635 | A | * | 6/1993 | Kagaya ................ 710/52 |
| 5,634,010 | A | * | 5/1997 | Ciscon et al. ............ 709/223 |
| 5,732,269 | A | * | 3/1998 | Compton et al. .......... 719/310 |
| 5,812,779 | A | * | 9/1998 | Ciscon et al. ............ 709/223 |
| 5,878,221 | A | * | 3/1999 | Szkopek et al. .......... 709/218 |
| 5,892,905 | A | * | 4/1999 | Brandt et al. ............. 726/11 |
| 6,085,030 | A | * | 7/2000 | Whitehead et al. ........ 709/203 |
| 6,163,796 | A | * | 12/2000 | Yokomizo ............... 709/203 |
| 6,304,917 | B1 | * | 10/2001 | Douceur et al. .......... 719/310 |
| 6,470,007 | B1 | * | 10/2002 | Berman ................. 370/351 |
| 6,535,929 | B1 | * | 3/2003 | Provino et al. .......... 719/321 |
| 6,546,419 | B1 | * | 4/2003 | Humpleman et al. ...... 709/223 |
| 6,633,904 | B1 | * | 10/2003 | Shinkai ................. 709/213 |
| 6,718,377 | B1 | * | 4/2004 | Bischoff et al. .......... 709/223 |
| 6,751,647 | B1 | * | 6/2004 | Srinivasan et al. ........ 709/203 |
| 6,785,542 | B1 | * | 8/2004 | Blight et al. ............ 455/426.1 |
| 6,831,908 | B2 | * | 12/2004 | Kikuchi ................. 370/338 |
| 6,993,102 | B2 | * | 1/2006 | Spence et al. ............ 375/354 |
| 6,993,606 | B1 | * | 1/2006 | Takaku et al. ............ 710/61 |

(Continued)

OTHER PUBLICATIONS

Chester "Cross-Platform Integration with XML and SOAP", pp. 36-34, 2001 IEEE.*

(Continued)

*Primary Examiner*—Van H. Nguyen
(74) *Attorney, Agent, or Firm*—Park, Vaughan & Fleming LLP (57) ABSTRACT

Handling data at one of a plurality of components, wherein the plurality of components includes at least a sink component and a source component. The source component transfers data to the sink component, and the sink component accesses an obtained data type handler object to invoke an interface implemented by the handler object. The invoked type handler interface includes source-specific instructions that are executed by the sink component regardless of whether the data is a format that the sink natively understands.

18 Claims, 3 Drawing Sheets

U.S. PATENT DOCUMENTS

2002/0124118 A1\* 9/2002 Colley et al. .............. 709/315
2003/0145089 A1\* 7/2003 Edwards et al. ............ 709/228

OTHER PUBLICATIONS

Jepsen "SOAP Cleans Up Interoperability Problems on the Web", pp. 52-55, 2001 IEEE.\*
Satoh "A Hierarchical Model of Mobile Agents and Its Multimedia Application", 2000 IEEE, pp. 103-108.\*
Avvenuti et al. "Embedding Remote Object Mobility in Java RMI", 2001 IEEE, pp. 1-7.\*
Waldo "Mobile Code, Distributed, Computing, and Agents", 2001 IEEE, pp. 10-12.\*
U.S. Appl. No. 09/838,933, filed Apr. 20, 2001 by Edwards et al., titled "System and Method for Enabling Communication Among Arbitrary Components."
U.S. Appl. No. 10/052,585, filed Jan. 23, 2002 by Newman et al., titled "System and Method for Providing Context Information."
U.S. Appl. No. 10/058,268, filed Jan. 29, 2002 by Edwards et al., titled "System and Method for Enabling Arbitrary Components to Transfer Data Between Each Other."
Bluetooth Consortium 2001, *Specification of the Bluetooth System*, Version 1.1 core, Table of Contents and Index (2001) [Retrieved from the Internet at http://www.bluetooth.com on Sep. 27, 2001].
Bluetooth Consortium 2001, *Specification of the Bluetooth System*, Version 1.1 core, Part C, pp. 184-252 (2001) [Retrieved from the Internet at http://www.bluetooth.com on Sep. 27, 2001].
Bluetooth Consortium 2001, *Specification of the Bluetooth System*, Version 1.1 core, Part D, pp. 255-330 (2001) [Retrieved from the Internet at http://www.bluetooth.com on Sep. 27, 2001].
Bluetooth Consortium 2001, *Specification of the Bluetooth System*, Version 1.1 core, Part E, pp. 332-392 (2001) [Retrieved from the Internet at http://www.bluetooth.com on Sep. 27, 2001].
Bluetooth Consortium 2001, *Specification of the Bluetooth System*, Version 1.1 core, Part F:1, pp. 394-424 (2001) [Retrieved from the Internet at http://www.bluetooth.com on Sep. 27, 2001].
Bluetooth Consortium 2001, *Specification of the Bluetooth System*, Version 1.1 core, Part F:4, pp. 512-534 (2001) [Retrieved from the Internet at http://www.bluetooth.com on Sep. 27, 2001].
Bluetooth Consortium 2001, *Specification of the Bluetooth System*, Version 1.1 core, Part H:2, pp. 782-796 (2001) [Retrieved from the Internet at http://www.bluetooth.com on Sep. 27, 2001].
Bluetooth Consortium 2001, *Specification of the Bluetooth System*, Version 1.1 core, Appendix III, pp. 914-922 (2001) [Retrieved from the Internet at http://www.bluetooth.com on Sep. 27, 2001].
N. Borenstein et al., "MIME (Multipurpose Internet Mail Extensions): Mechanisms for Specifying and Describing the Format of Internet Messages," pp. 1-77 (1992) [Retrieved from the Internet at http://www.oac.uci/edu/indiv/ehood/MIME/1521/rfc1521TOC.html on Sep. 14, 2001].
E. Christensen et al., *Web Services Description Language (WSDL) 1.1*, (Jan. 23, 2001) [Retrieved from the Internet at http://msdn.microsoft.com/xml/general/wsdl.asp on Sep. 27, 2001].
N. Cutland, *Computability*, Cambridge University Press, pp. 7-42 (1980).
A. Dey et al., "A Conceptual Framework and a Toolkit for Supporting the Rapid Prototyping of Context-Aware Applications," *Human Computer Interaction Journal*, 16:1-67 (2001).
P. Dourish et al., "Extending Document Management Systems with User Active Properties," *ACM Transactions on Information Systems*, Xerox Palo Alto Rearch Center, pp. 1-27 (2000).
N. Economides, "The Economics of Networks,"*International Journal of Industrial Organization*, 14:2, pp. 1-36 (1996).
W. K. Edwards, "Session Management for Collaborative Applications," *Proceedings of ACM Conference on Computer-Supported Cooperative Work (CSCW '94)*, Georgia Institute of Technology, Chapel Hill, NC, (1994).
A. Fox et al., "Integrating Information Appliances into an Interactive Space," *IEEE Computer Graphics and Applications*, Stanford University, 20:3, pp. 54-65 (2000).

E. Gamma et al., *Design Patterns: Elements of Reusable Object-Oriented Software*, Addison-Wesley, pp. 1-31 (1995).
Y. Goland et al., *Simple Service Discovery Protocol/1.0: Operating Without an Arbiter*, Internet Engineering Task Force Internet Draft (1999) [Retrieved from the Internet at http://www.upnp.org/draft_cai_sssdp_v1_03.txt on Sep. 14, 2001].
C. Gray et al., "Leases: An Efficient Fault-Tolerant Mechanism for Distributed File Cache Consistency,"*Proceedings of the 12th ACM Symposium on Operating Systems Principles (SOSP)*, Association of Computing Machines, pp. 202-210 (1989).
*User Interface Markup Language 2.0 Draft Specification*, Harmonia, Inc., pp. 1-64, (2000) [Retrieved from the Internet at http://www.uiml.org/specs/uim12/index.htm on Sep. 14, 2001].
T. Hodes et al., "A Document-Based Framework for Internet Application Control," *Proceedings of the Second USENIX Symposium on Internet Technologies and Systems (USITS)*, USENIX Asssociation, Boulder, CO, pp. 59-70 (1999).
D. Iseminger, *COM+ Developer's Reference*, Microsoft Press, pp. 1-6 (2000).
E. Kiciman et al., "Using Dynamic Mediation to Integrate COTS Entities in a Ubiquitous Computing Environment," *Proceedings of the Second International Symposium on Handheld and Ubiquitous Computing (HUC)*, Stanford University (2000).
G. Kiczales et al., *The Art of the Metaobject Protocol*, MIT Press, pp. 12-46 (1991).
T. Kindberg et al., "A Web-Based Nomadic Computing System," *HP Labs Technical Report HPL-2000-110* , pp. 1-13 (2000) [Retrieved from the Internet at http://cooltown.hp.com/papers/nomadic/nomadic.htm on Sep. 14, 2001].
[Author Unknown] "Plug and Play Specifications," Microsoft Corp., (1999) [Retrieved from the Internet at http://www.microsoft.com/HWDEV/respec/pnpspecs.htm on Sep. 14, 2001].
[Author Unknown] "Universal Plug and Play," Microsoft Corp. (2000) [Retrieved from the Internet at http://msdn.microsoft.com/library/psdk/upnp/upnpport_6zz9 on Sep. 27, 2001].
[Author Unknown] "C# Language Specification," Microsoft Corp., Microsoft Press, pp. 1-41 (2001).
W. Newman et al., "Cam-Works: A Video-based Tool for Efficient Capture from Paper Source Documents," *Proceedings of the International Conference on Multimedia Computing and Systems*, Florence, Italy, vol. 2, pp. 647-653 (1999).
J. Ockerbloom, *Mediating Among Diverse Data Formats*, Ph.D. thesis, Carnegie Mellon University, pp. 1-150 (1999).
[Author Unknown] "White Paper: Salutation Architecture: Overview," Salutation Consortium (1998) [Retrieved from the Internet at http://www/salutation.org/whitepaper/originalwp.pdf on Sep. 27, 2001].
E. Saund, "Bringing the Marks on a Whiteboard to Electronic Life," *Cooperative Buildings: Integrating Information, Organizations, and Architecture, Second International Workshop*, Xerox Palo Alto Research Center (1999).
[Author Unknown] "JavaBeans Specification," Sun Microsystems, pp. 1-114 (1997) [Retrieved from the Internet at http://ja-va.sun.com/products/javabeans/docs/beans.101.pdf on Sep. 14, 2001].
[Author Unknown] "Jini Discovery and Join Specification," Sun Microsystems, pp. 1-32 (1999).
[Author Unknown] "UDDI Technical Whitepaper," Universal Description Discovery, and Integration Consortium, pp. 1-12 (2000) [Retrieved from the Internet at http://www.uddi.org/pubs/Iru_UDDI_Technical_White_Paper.PDF on Sep. 14, 2001].
B. Venners, *Jini Service UI Draft Specification* (2000) pp. 1-25 [Retrieved from the Intenet at http://www.artima.com/jini/serviceui/ DraftSpec.html on Sep. 27, 2001].
J. Waldo, "The Jini Architectecture for Network-centric Computing," *Communications of the ACM*, 42:7, pp. 76-82 (1999).
M. Weiser et al., "Designing Calm Technology" (1995) pp. 1-5 [Retrieved from the Internet at http:/ /www.fxpal.com.ConferencesWorkshops/chi97/white-papers/Mark%2520Weiser.html on Oct. 10, 2001].
A. Wollrath et al., "A Distributed Object Model for the Java System," *USENIX Computing Systems*, vol. 9 (1996).
*Jini™ Architectural Overview Technical White Paper*, Sun Microsystems, Inc., Palo Alto, California, pp. 1-23 (1999).

*Jini™ Technology Glossary*, Sun Microsystems, Inc., Palo Alto, California, pp. 479-499 (2000).

*Jini™ Device Architecture Specification*, Sun Microsystems, Inc., Palo Alto, California, pp. 1-14 (2000).

*JavaSpaces™ Service Specification*, Sun Microsystems, Inc., Palo Alto, California, pp. 1-24 (2000).

*Jini™ Technology Core Platform Specification*, Sun Microsystems, Inc., Palo Alto, California, pp. 1-126 (2000).

*A Collection of Jini™ Technology Helper Utilities and Services Specifications*, Sun Microsystems, Inc., Palo Alto, California, pp. 1-214 (2000).

*Universal Description, Discovery and Integration Data Structure Reference V1.0*, Ariba, Inc. and International Business Machines Corporation and Microsoft Corporation, pp. 1-31 (2000).

*Universal Description, Discovery and Integration Programmer's API 1.0*, Ariba, Inc., International Business Machines Corporation and Microsoft Corporation, pp. 1-67 (2000).

*Universal Description, Discovery and Integration Technical White Paper*, Ariba, Inc., International Business Machines Corporation and Microsoft Corporation, pp. 1-12 (2000).

*Mapping Salutation Architecture APIs to Bluetooth Service Discovery Layer*, Version 1, IBM Corp., pp. 1-26 (1999).

*Bluetooth Protocol Architecture*, Version 1, Nokia Mobile Phones, pp. 1-20 (1999).

W. Edwards et al., "At Home with Ubiquitous Computing: Seven Challenges," *G.D. Abowd, B. Brumitt, S.A.N. Shafer (Eds.): Ubicomp 2001, LNCSA 2201*, pp. 256-272, (2001).

\* cited by examiner

METHOD AND SYSTEM FOR HANDLING DATA

FIELD OF THE INVENTION

This invention relates generally to communication methods and systems, and, more particularly, to a method and system for handling data at one of a plurality of arbitrary components from another one of the plurality of components using a data type handler object.

BACKGROUND OF THE INVENTION

In a networked setting, components, such as devices, services and/or applications, may need to exchange data. A few of these components may be able to essentially accept and provide arbitrary types of data without restriction. For example, a file server might accept data in any format for storage in a file, since it does need to understand/parse/use the actual contents to store them.

However, many components must be able to understand the data types they receive in order to function properly. For example, a printer may only understand a Postscript data type format, or a projector may only understand .GIF data type formats. But, if the printer does not receive data in a Postscript format, or the projector does not receive data in a .GIF format, then the printer can not print and the projector can not display the received data.

As a result, compatibility is limited to a set of fixed data types that a particular sender can provide and a particular receiver can understand and use. Typically, changing this fixed set of data types for the senders and receivers of data requires rewriting the components to be able to process the new data types. For example, the printer would need to be reprogrammed to handle a new type of data, such as PDF, or the data sender would need a filter or translation mechanism installed ahead of time that can convert the data before sending it to the printer. These conversions will work, but unfortunately the data sender, such as a computer, or the data recipient, such as the printer, will have to be preprogrammed as described above or the data transfer will fail.

SUMMARY OF THE INVENTION

A method and computer readable medium in accordance with embodiments of the present invention includes receiving data at a sink component, where the data sent is from a source component, invoking at least one interface included in a data type handler object accessible to the sink component, executing at least one instruction associated with the invoked interface, and handling the received data based upon the executed instruction.

A system in accordance with embodiments of the present invention includes a sink component in communication with a source component. The sink component has a data type handler object with at least one interface. Further the interface has at least one instruction which when executed enables the sink component to handle data received from the source component.

The present invention uses mobile code to transparently and dynamically extend the behavior of components to allow them to use new types of data on the fly without requiring explicit, prior programming. In particular, the present invention provides a data type handler object that includes a sender-specific implementation of at least one interface that the sink component can execute to handle an unfamiliar data type received from a source component. As a result, compatibility of components is no longer limited to the set of fixed data types that a particular source component can provide and a particular sink component can use.

DETAILED DESCRIPTION OF THE INVENTION

Figure 1:
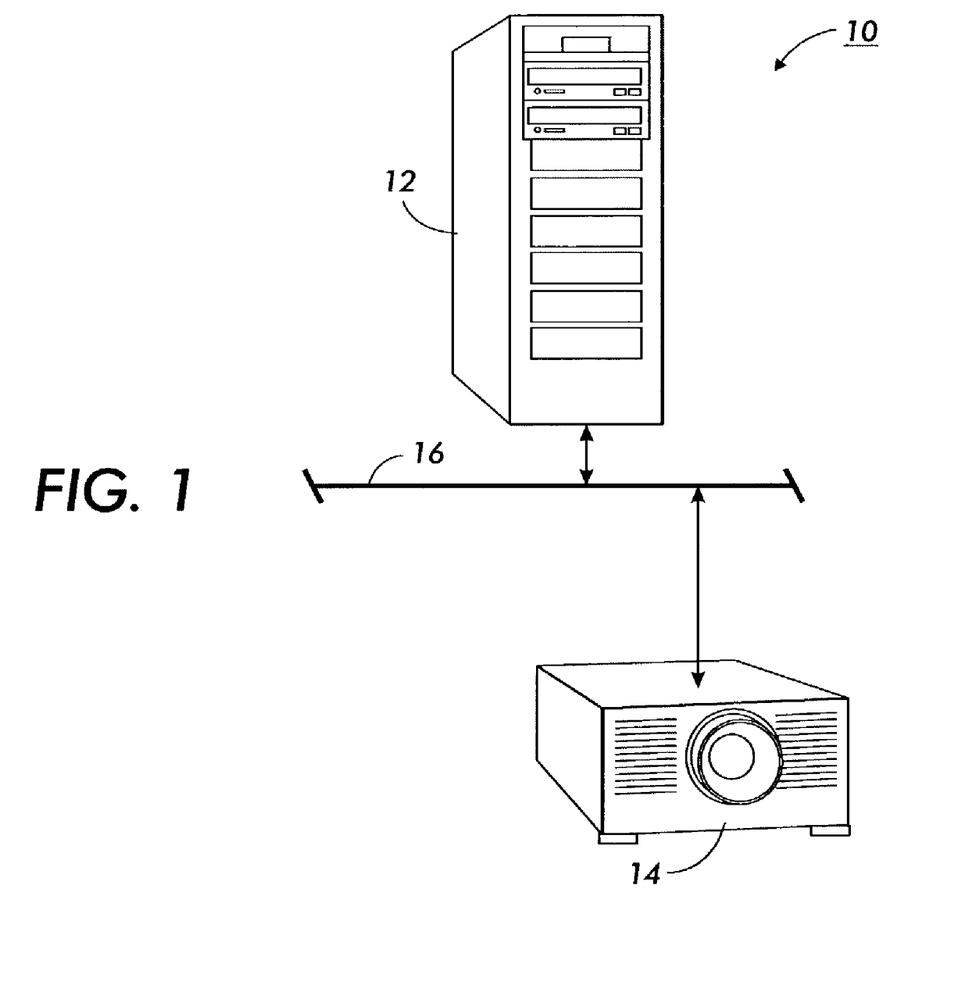
FIG. 1 is a perspective view of a system for handling data at one of a plurality of components in accordance with embodiments of the present invention.
Figure 2:
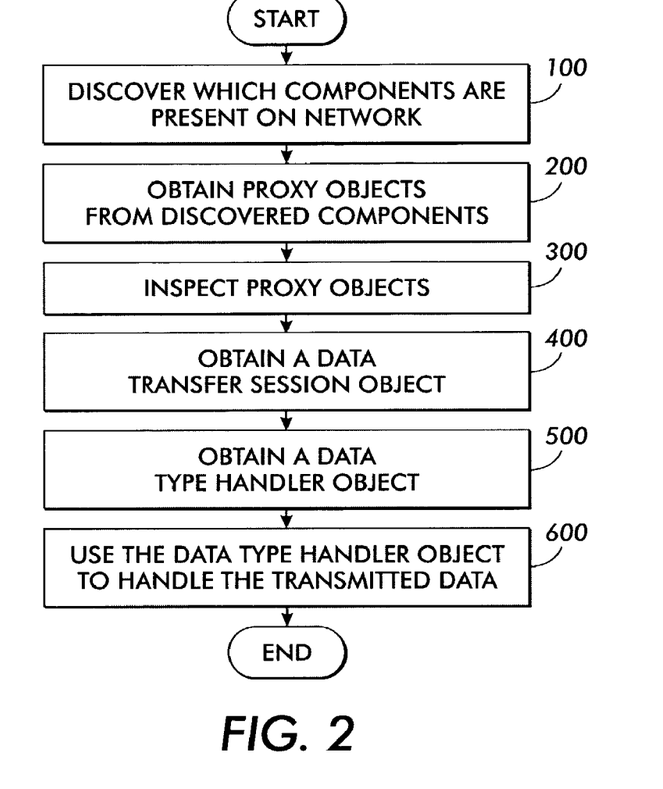
FIG. 2 is a flow chart of a method for handling data at one of a plurality of components in accordance with embodiments of the present invention.

A system 10 and method for handling data at one of a plurality of components in accordance with embodiments of the present invention are illustrated in FIGS. 1 and 2. The system 10 includes a data source component, such as a server component 12, coupled via a network 16 to a data sink component, such as a projector component 14, which uses an obtained data type handler object 20(2) to handle a new type of data. The present invention transparently and dynamically extends the behavior of components to allow them to use new data types on the fly without requiring explicit, prior programming.

In embodiments of the present invention, server component 12 performs functions, such as data storage, file management and network 16 routing, although server component 12 could have other functions. Server component 12 includes a processor, an input/output ("I/O") unit and a memory, which are coupled together by one or more bus systems or other communication links, although the server component 12 can comprise other elements in other arrangements. The processor executes at least a portion of the programmed instructions for handling data at one of a plurality of components in accordance with embodiments of the present invention as described herein and as set forth in FIGS. 2-4.

These programmed instructions for handling data at one of a plurality of components are stored in the memory for execution by the processor. A variety of different types of devices can be used for the memory, such as a random access memory ("RAM") or a read only memory ("ROM") in the system, or a floppy disk, hard disk, or CD ROM, which is read from and/or written to by a magnetic or optical reading and/or writing system that is coupled to the processor. The memory is used to store these programmed instructions as well as other information, although the instructions may be stored elsewhere. The I/O unit is used by the server component 12 to operatively couple and communicate with other components, such as the projector component 14, over the network 16 using a line based medium such as an Ethernet™, although other types of networks 16 can be used including a wireless network 16, such as Bluetooth™.

The projector component 14 can project images, such as text and/or graphics, onto a fixed medium, such as a projection screen, although the projector component 14 could have other functions. The projector component 14 includes a projection system and a control system with a processor, I/O unit and a memory, which are coupled together by one or more bus systems or other communication links, although the projector component 14 can comprise other elements in other arrangements, such as having the control system external to the projector component 14. The processor executes at least a portion of the programmed instructions for handling data at one of a plurality of components in accordance with embodiments of the present invention as described herein and as set forth in FIGS. 2-4.

These programmed instructions for handling data at one of a plurality of components are stored in the memory for execution by the processor. A variety of different types of devices can be used for the memory, such as a RAM or a ROM in the system, or a floppy disk, hard disk, or CD ROM which is read from and/or written to by a magnetic or optical reading and/or writing system that is coupled to the processor. The memory can be used to store these programmed instructions as well as other information, although the instructions may be stored elsewhere. The I/O unit is used by the projector component 14 to operatively couple and communicate with other components, such as the server component 12, over the network 16 using a line based medium such as an Ethernet™, although other types of networks 16 can be used including a wireless network 16 such as Bluetooth™.

Components, such as server component 12 and projector component 14, are provided for exemplary purposes only. In embodiments of the present invention, the components may comprise any type of device or system that can store, process and execute instructions for performing one or more methods of the present invention as will be described in further detail herein, although the components may also comprise executable programs or other types of software entities that may be executed by or reside in a memory of a device or system. By way of example only, the components shown in FIG. 1 may also comprise scanners, lap-top computers, cellular telephones, display devices, video input/output devices, audio input/output devices, copier devices, printer devices, remote control devices, appliances and file systems or databases residing in a computer system.

The network 16 enables the server component 12 and the projector component 14 to communicate with each other and any other components with access to network 16 at least at a basic level using a TCP/IP protocol, although other protocols may be used. In embodiments of the present invention, the network 16 comprises the Internet, although other types of networks 16 may be used, such as a local area network 16 ("LAN"), a wide area network 16 ("WAN"), a telephone line network 16, a coaxial cable network 16, and/or a wireless network 16.

The operation of the system 10 for handling data at one of a plurality of components in accordance with embodiments of the present invention will now be described with reference to FIGS. 1-4. The term "component" means one or more applications or programs executing on the server component 12 or the projector component 14, such as a slide show program, although components may refer to the actual hardware devices executing those applications. For ease of discussion and illustration, reference will be made generally to the server component 12 and projector component 14 throughout embodiments of the present invention.

By way of example only, a user at a client of the server component 12 may desire presenting slides stored in files for a slide show presentation. But the client may not have sufficient processing and memory capacities to store and operate an entire slide show program, such as MS PowerPoint™. Further, the client display may hinder presenting the show to a group of users because of a limited display area. Thus, the client user may desire accessing a slide show program component or other component programs stored elsewhere, such as the server component 12, to display the stored slides using a suitable device, such as the projector component 14. Moreover, a user of projector component 14 may desire to participate in the data transfer, such as viewing and controlling the slides as they are presented.

Accordingly, at step 100, server component 12 performs a discovery process to determine which components are present on the network 16, what their data transfer capabilities are, and what their native data types are. Server component 12 is programmed to automatically perform the discovery process upon the user expressing a desire to establish a particular type of communication, such as data transfer where a client of server component 12 desires transferring stored slides to a projector component 14 for display, although the server component 12 may be programmed in other manners, such as to allow the user to manually initiate the discovery process.

In embodiments of the present invention, server component 12 discovers projector component 14 using a Jini system discovery protocol system, although a number of other discovery protocols may be used, such as Bluetooth™ SLP, UDDI or a look-up process as disclosed in co-pending U.S. patent application Ser. No. 10/058,268 to Edwards et al., titled "SYSTEM AND METHOD FOR ENABLING ARBITRARY COMPONENTS TO TRANSFER DATA BETWEEN EACH OTHER," filed Jan. 29,2002, which is hereby incorporated by reference in its entirety.

Server component 12 may display the discovered components (not illustrated), as disclosed in co-pending U.S. patent application Ser. No. 10/212,377 to Edwards et al., titled "SYSTEM AND METHOD FOR ENABLING COMPONENTS ON ARBITRARY NETWORKS TO COMMUNICATE," filed concurrently herewith, which is hereby incorporated by reference in its entirety, and the user may select the components desired to be involved in the data transfer, although server component 12 may be programmed to automatically select the components based upon a number of criteria, such as component availability or the physical location of the components in network 16.

At step 200, the projector component 14 returns a projector proxy object to the server component 12, which is stored in the memory of server component 12. The proxy object can provide a list of the data types in which it can receive data. The list is provided in a MIME format, although other formats may be used, such as generic text strings. The proxy object also provides a list of one or more data type handler interfaces associated with the projector component 14 and that the projector 14 may accept and execute. Further, the proxy object also implements one or more universal interfaces associated with the projector component 14, which are accessible to the server component 12, such as a data sink interface, as disclosed in U.S. Pat. No. 7,296,042 by Edwards et al., titled "SYSTEM AND METHOD FOR ENABLING COMMUNICATION AMONG ARBITRARY COMPONENTS."

In embodiments of the present invention, the proxy object, its associated operations, instructions and interfaces, as well as any other interfaces, operations and instructions that may be subsequently described herein, comprise mobile code, such as JAVA, although other languages may be used, such as Smalltalk, CLOS, Ada or Object Pascal. Mobile code is executable data, such as object oriented code, which can be transmitted to server component 12 or projector component 14 where it is executed as described herein, although other types of programming methodologies may be used such as procedural-oriented, logic-oriented, rule-oriented or constraint oriented.

In embodiments of the present invention, the server component 12 and the projector component 14 each have stored in their respective memories programming to understand the semantics of a basic set of universal interfaces associated with the proxy objects and their associated operations, instructions and data, which will be described in further detail herein. The particular universal interfaces used are responsive to the needs of applications for particular services, such as printing a file being operated on by a word processing program. However, the basic semantic programming does not need to include the particulars of the specific services involved, only the semantics of the universal interfaces used in embodiments of the present invention as described further herein below.

In embodiments of the present invention, server component 12 has stored in its memory and implements, or otherwise has access to ("associated with"), a data source interface, although the server component 12 may also implement a variety of other interfaces, such as a contextual interface, a notification interface and a user interface, as disclosed in co-pending U.S. patent application Ser. No. 10/058,268 to Edwards et al., titled "SYSTEM AND METHOD FOR ENABLING ARBITRARY COMPONENTS TO TRANSFER DATA BETWEEN EACH OTHER," filed Jan. 29, 2002, which has already been incorporated by reference in its entirety. In embodiments of the present invention, the projector component 14 is associated with a data sink interface, although the projector component 14 can also be associated with a variety of other interfaces, in the same manner described above with respect to the server component 12.

At step 300, the server component 12 inspects the proxy object to determine which data type handler interfaces and data types can be accepted and understood by the projector component 14. By way of example only, the server component 12 examines the list of data type handler interfaces and data types provided in the proxy object by the projector component 14, described above in connection with step 200. The server component 12 determines that the projector component 14 has been programmed to understand the semantics of a viewer interface. Thus, the projector component 14 may accept, understand and execute mobile code instructions that may be provided by another component, such as server component 12, that implements the viewer interface. Moreover, the server component 12 determines that in addition to the type handler interface "Viewer," the projector component 14 can also understand data provided in a JPEG data type format.

Further in this example, the server component 12 can provide mobile code that implements the viewer interface, and can also provide data in an MS PowerPoint™ data type format. Although a viewer interface is used in this example, the server component 12 can provide, and the projector component 14 can accept and implement, other types of interfaces, such as an editor interface that can modify received data in certain formats, a printer interface that can be used by a component to render a data type on a printer, and a converter interface that changes data from one data type to another.

The server component 12 also determines that the projector component 14 is associated with at least a data sink interface, as described in U.S. Pat. No. 7,296,042 to Edwards et al., titled "SYSTEM AND METHOD FOR ENABLING COMMUNICATION AMONG ARBITRARY COMPONENTS," which is hereby incorporated by reference in its entirety. Thus, the projector component 14 at least has the capability to receive data provided by a component having access to its data sink interface. The server component 12 in this example understands the semantics of data sink interfaces, such as the data sink interface associated with the projector component 14, and thus can invoke the interface to provide the projector 14 with data.

Figure 3:
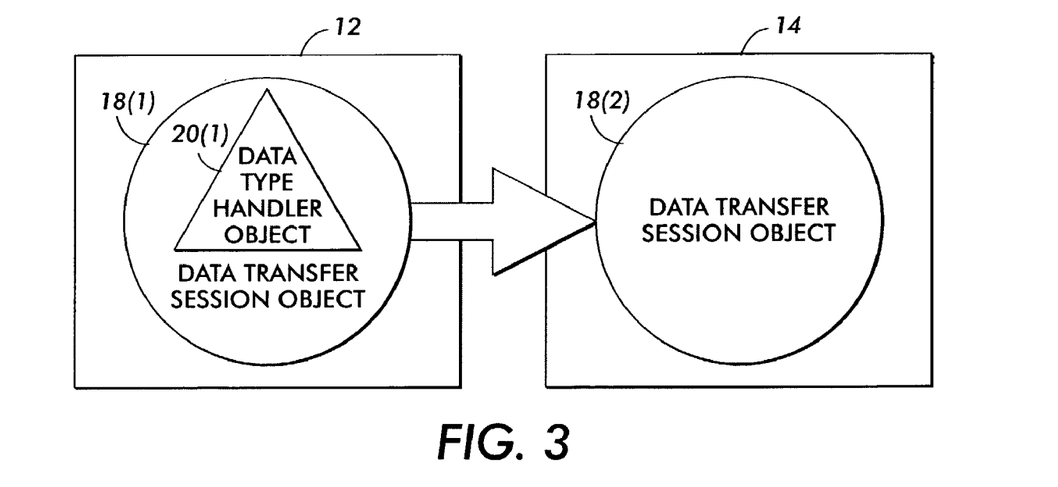
FIGS. 3-4 are functional block diagrams of a method for handling data at one of a plurality of components in accordance with embodiments of the present invention.

Accordingly, at step 400, the server component 12 creates a data transfer session object 18(1) and invokes the data sink interface associated with the projector component 14, passing the session object 18(1) into the interface call. The projector component 14 receives a data transfer session object 18(2) from the server component 12, which is a copy of the data transfer session object 18(1) as shown in FIG. 3.

The data transfer session objects 18(2) includes instructions, operations and data that are specific to the server component 12, yet may be understood and executed by the projector component 14.

The projector component 14 executes an operation or operations in the session object 18(2) to enable the projector component 14 to retrieve the data from the server component 12. The instructions included in the data transfer session object 18(2) may also include instructions that when executed by the projector component 14 instruct the component 14 to request a copy of the data type handler object 20(1) to handle the data. Thus, in this example the projector component 14 requests a copy of the data type handler object 20(1).

Figure 4:
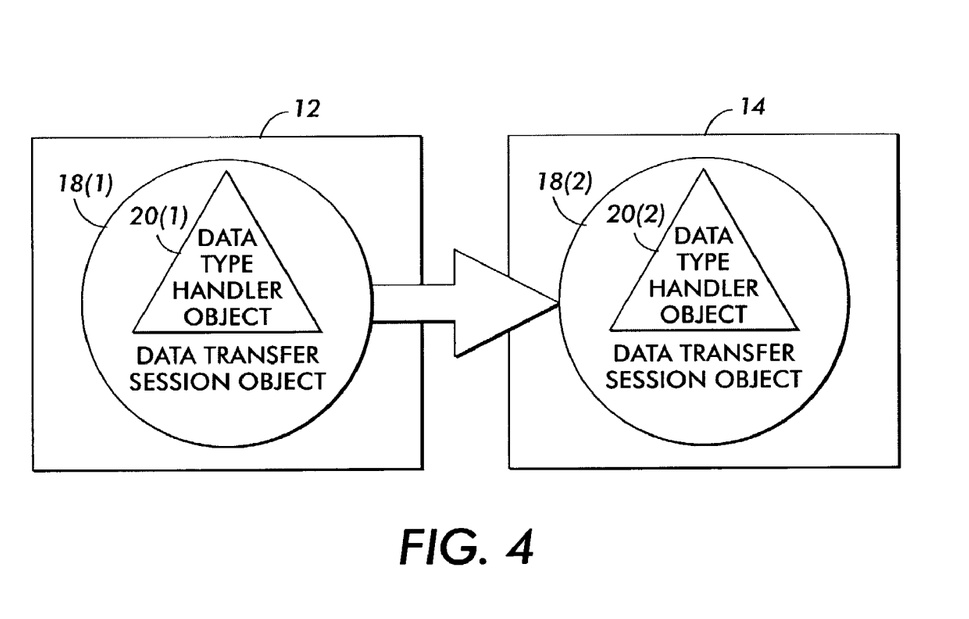

Accordingly, at step 500 and referring to FIG. 4, the projector component 14 obtains data type handler object 20(2), which is associated with the data transfer session object 18(2) and thus accessible to the projector component 14, although the projector component 14 could obtain the data type handler object 20(2) from other sources, such as another component coupled to the network 16 or from memory in the projector component 14. The data type handler objects 20(1)-20(2) are expressed in the data transfer session object 18(2) as tuples in the format "[native data type, interface]". In this example, the data transfer session object 18(2) may include the tuple "[application/powerpoint, com.PARC.Viewer]," which indicates that the data type handler objects 20(1)-20(2) provide a specific implementation of the viewer interface that can be executed to view MS PowerPoint™ files.

Thus at step 600, the projector component 14 begins receiving the MS PowerPoint™ data from the server component 12. The viewer interface that is accessible to the projector component 14 through the data type handler object 20(2) includes data type handling instructions that enable the projector component 14 to handle data types that are not native to the projector component 14 during the data transfer. In this example, the type handler object 20(2) includes instructions that are particular to the server component 12, but that projector component 14 may retrieve and execute for viewing MS PowerPoint™ slide data from the server component 12 to be projected. The projector component 14 invokes the interface to handle the data, such as for projecting the images represented by the data.

As a result, even though the projector component 14 in this example is initially programmed to understand only JPEG data types, with the data type handler object 20(2) the projector component 14 may implement the viewer interface and execute the instructions to be able to interact with and process MS PowerPoint™ data to project the images represented by the data. Moreover, the data type handler object 20(2) may include instructions that cause the projector component 14 to request controller objects from the server component 12 to control one or more aspects of the data transfer, as disclosed in co-pending U.S. patent application Ser. No. 10/212,376 to Edwards et al., titled "SYSTEM AND METHOD FOR CONTROLLING COMMUNICATION," filed concurrently herewith, which is hereby incorporated by reference in its entirety.

An alternative embodiment of the system 10 will now be described. In this embodiment, steps 100-400 and 700 are performed as described above, but steps 500-600 are not performed. Instead of the projector component 14 receiving a data type handler object 20(2) from the server component 12 as described above at step 600, the data type handler object 20(2) is pre-installed in the projector component 14, although the data type handler object 20(2) may be downloaded from another component on the network 16, or the data type handler object 20(2) may be pre-installed in the server component 12. For instance, a system administrator ("SA") of the network 16 may remotely install the data type handler object 20(2) on the memory of the projector component 14, and the data type handler object 20(2) is used as described above in connection with step 700, although the data type handler object 20(2) may be stored on a portable memory medium, such as a CD-ROM or a floppy disk. In this case, the portable memory medium may be read by the projector component 14 to retrieve the data type handler object 20(2), which is then stored on a fixed memory medium of the component 14 to be used as described above in connection with step 700.

The present invention transparently and dynamically extends the behavior of the projector component 14, in this example, to allow the project component 14 to receive the MS PowerPoint™ file data transferred to it from the server component 12. The present invention advantageously uses the data type handler objects 20(1)-20(2), which include mobile code, to interact with and process the MS PowerPoint™ data sent from the server component 12. Therefore, the projector component 14 does not require explicit, prior programming to be able to handle the MS PowerPoint™ data.

As a result, compatibility of components, such as the server component 12 and the projector component 14, is no longer limited to the set of fixed data types each component is initially programmed to understand and that both components agree on. Furthermore, the mobile code associated with the data type handler objects 20(1)-20(2) provides substantial benefits in that only a set amount of code needs to be provided for enabling the projector component 14 to understand the MS PowerPoint™ data sent to it from the server component 12, rather than requiring that the entire MS PowerPoint™ program package be installed in a memory of the projector component 14.

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefor, is not intended to limit the claimed processes to any order except as may be specified in the claims.

What is claimed is:

1. A method for handling an unfamiliar type of data at one of a plurality of components between computer systems which include at least a sink component and/or a source component, the method comprising:

automatically performing, at the source component, a discovery process to determine data transfer capabilities and native data types of the sink component;

in response to the discovery process, receiving a proxy object at the source component, wherein the proxy object provides a list of data types in which the sink component can receive data;

inspecting the proxy object to determine which data type handler interfaces and data types can be accepted and understood by the sink component;

receiving a data transfer session object at the sink component, the data transfer session object sent from the source component;

executing one or more operations in the data transfer session object to retrieve data from the source component;

obtaining a data type handler object from the source component, wherein the data type handler object includes mobile code implementing one or more data type handler interfaces that transparently and dynamically extend the capabilities of the sink component to handle new types of data that are not native to the sink component;

invoking, by the sink component, at least one data type handler interface included in the data type handler object;

executing, by the sink component, at least one source-specific instruction associated with the invoked data type handler interface, wherein the at least one source specific instruction provides capabilities for handling the retrieved data; and handling the retrieved data based upon the executed source specific instruction.

2. The method as set forth in claim 1 further comprising pre-installing the data type handler object on the sink component.

3. The method as set forth in claim 1 wherein obtaining the data type handler object further comprises using mobile code included with the data transfer session object to download the data type handler object from the source component to the sink component.

4. The method as set forth in claim 1 further comprising obtaining the data type handler object from another one of the plurality of components.

5. The method as set forth in claim 4 wherein obtaining the data type handler object further comprises using mobile code included with the data transfer session object to download the data type handler object from the another one of the plurality of components to the sink component.

6. The method as set forth in claim 1, wherein the data transfer session object obtained is based on at least the proxy objects for the sink component and the source component.

7. A computer-readable medium having stored thereon instructions, which when executed by at least one processor, causes the processor to perform a method for handling an unfamiliar type of data at one of a plurality of components between computer systems which include at least a sink component and/or a source component, the method comprising:

automatically performing, at the source component, a discovery process to determine data transfer capabilities and native data types of the sink component;

in response to the discovery process, receiving a proxy object at the source component, wherein the proxy object provides a list of data types in which the sink component can receive data;

inspecting the proxy object to determine which data type handler interfaces and data types can be accepted and understood by the sink component;

receiving a data transfer session object at the sink component, the data transfer session object sent from the source component;

executing one or more operations in the data transfer session object to retrieve data from the source component;

obtaining a data type handler object from the source component, wherein the data type handler object includes mobile code implementing one or more data type handler interfaces that transparently and dynamically extend the capabilities of the sink component to handle new types of data that are not native to the sink component;

invoking, by the sink component, at least one data type handler interface included in the data type handler object;

executing, by the sink component, at least one source-specific instruction associated with the invoked data type handler interface, wherein the at least one source specific instruction provides capabilities for handling the retrieved data; and handling the retrieved data based upon the executed source specific instruction.

8. The medium as set forth in claim 7 further comprising pre-installing the data type handler object on the sink component.

9. The medium as set forth in claim 7 wherein obtaining the data type handler object further comprises using mobile code included with the data transfer session object to download the data type handler object from the source component to the sink component.

10. The medium as set forth in claim 7 further comprising obtaining the data type handler object from another one of the plurality of components.

11. The medium as set forth in claim 10 wherein obtaining the data type handler object further comprises using mobile code included with the data transfer session object to download the data type handler object from the another one of the plurality of components to the sink component.

12. The medium as set forth in claim 7, wherein the data transfer session object obtained is based on at least the proxy objects for the sink component and the source component.

13. A system for handling an unfamiliar type of data at one of a plurality of components between computer systems which include at least a sink component and/or a source component, the system comprising:

a sink component in communication with a source component, wherein the sink component and the source component include separate processors for executing instructions to handle data;

wherein the source component:

automatically performs a discovery process to determine data transfer capabilities and native data types of the sink component;

in response to the discovery process, receives a proxy object at the source component, wherein the proxy object provides a list of data types in which the sink component can receive data; and inspects the proxy object to determine which data type handler interfaces and data types can be accepted and understood by the sink component;

wherein the sink component:

receives a data transfer session object from the source component;

executes instructions included in the data transfer session object to retrieve data from the source component;

obtains a data type handler object from the source component, wherein the data type handler object includes mobile code implementing one or more data type handler interfaces that transparently and dynamically extend the capabilities of the sink component to handle new types of data that are not native to the sink component;

invokes at least one data type handler interface included in the data type handler object;

executes at least one source-specific instruction associated with the invoked data type handler interface, wherein the at least one source specific instruction provides capabilities for handling the received retrieved data; and handles the received retrieved data based upon the executed source specific instruction.

14. The system as set forth in claim 13 wherein the data type handler object is pre-installed on the sink component.

15. The system as set forth in claim 13 wherein mobile code included with the data transfer session object is used to download the data type handler object from the source component to the sink component.

16. The system as set forth in claim 13 wherein the sink component obtains the data type handler object from another one of the plurality of components.

17. The system as set forth in claim 16 wherein mobile code included with the data transfer session object is used to download the data type handler object from the another one of the plurality of components to the sink component.

18. The system as set forth in claim 13 wherein the sink component obtains the data transfer session object based on at least the source and sink proxy objects.

* * * * *